US008899882B2

(12) United States Patent
Oestergaard et al.

(10) Patent No.: US 8,899,882 B2
(45) Date of Patent: Dec. 2, 2014

(54) JACKET ASSEMBLY GUIDE

(75) Inventors: Thomas Oestergaard, Kolding (DK);
Henrik Stiesdal, Odense C (DK)

(73) Assignee: Siemens Aktiengesellschaft, Munich (DE)

( * ) Notice: Subject to any disclaimer, the term of this patent is extended or adjusted under 35 U.S.C. 154(b) by 156 days.

(21) Appl. No.: 13/444,917

(22) Filed: Apr. 12, 2012

(65) Prior Publication Data

US 2012/0263544 A1    Oct. 18, 2012

(30) Foreign Application Priority Data

Apr. 15, 2011    (EP) ..................................... 11162612

(51) Int. Cl.
*E02B 17/00*    (2006.01)
*E04H 12/10*    (2006.01)
*E04H 12/34*    (2006.01)

(52) U.S. Cl.
CPC ................ *E02B 17/00* (2013.01); *E04H 12/10* (2013.01); *E02B 17/0004* (2013.01); *E04H 12/34* (2013.01); *Y02E 10/728* (2013.01); *E02B 2017/0091* (2013.01)
USPC ........................................ 405/224; 174/45 R

(58) Field of Classification Search
USPC ................ 405/195.1, 224, 225; 182/129
See application file for complete search history.

(56) References Cited

U.S. PATENT DOCUMENTS

| 3,575,005 | A | * | 4/1971 | Sumner | 405/196 |
| 3,716,993 | A | * | 2/1973 | Sumner | 405/198 |
| 3,861,734 | A | * | 1/1975 | Welch | 294/74 |
| 3,874,180 | A | * | 4/1975 | Sumner | 405/198 |
| 3,974,657 | A | * | 8/1976 | Sumner | 405/209 |
| 5,941,662 | A | * | 8/1999 | Weaver | 405/211.1 |
| 2004/0128940 | A1 | * | 7/2004 | LaForge | 52/655.1 |
| 2007/0240622 | A1 | | 10/2007 | Hu | |
| 2007/0243063 | A1 | * | 10/2007 | Schellstede | 416/10 |
| 2010/0150663 | A1 | * | 6/2010 | Torres Martinez | 405/222 |

FOREIGN PATENT DOCUMENTS

| GB | 1317854 A | 5/1973 |
| GB | 1512634 A | 6/1978 |

OTHER PUBLICATIONS

European Search Report dated Oct. 5, 2011; 6 Pages.

\* cited by examiner

*Primary Examiner* — Benjamin Fiorello
*Assistant Examiner* — Kyle Armstrong

(57) ABSTRACT

A jacket assembly guide for assembling a jacket structure is provided. The jacket structure includes a plurality of legs, a plurality of connecting braces and a plurality of node elements arranged on the legs for connecting the braces to the legs. The assembly guide includes a plurality of supporting towers for supporting the plurality of legs such that a supported leg is held in a position corresponding to the position of that leg in the assembled state of the jacket structure. The assembly guide further includes a plurality of connecting devices for releasably connecting one of the legs to one of the supporting towers.

16 Claims, 7 Drawing Sheets

JACKET ASSEMBLY GUIDE

CROSS REFERENCE TO RELATED APPLICATIONS

This application claims priority of European Patent Office application No. 11162612.3 EP filed Apr. 15, 2011. All of the applications are incorporated by reference herein in their entirety.

FIELD OF INVENTION

The invention describes a jacket assembly guide, a method of assembling a jacket structure, and a jacket structure.

BACKGROUND OF INVENTION

A wind turbine for an offshore wind park must be mounted securely to withstand the forces exerted on it by water and wind. In shallow offshore locations, the wind turbine tower can be mounted on a concrete plinth or foundation that extends into the sea bed. However, for other offshore locations, such mounting techniques may be unsuitable for various reasons. Usually, a "jacket structure" made of three or four upright steel pipes or legs is used to support the wind turbine tower in such a deep offshore location. The upright legs are interconnected by a mesh of braces in the manner of a pylon. The relatively small surface area of such a jacket structure means that it can withstand the forces exerted on it by the water in which it is submerged. The jacket structure is usually relatively narrow at the top, becoming progressively wider towards the base to provide the necessary structural stability. The base of the jacket structure can be anchored to a concrete foundation on the sea bed, or each leg of the jacket structure could be secured to a separate pile driven into the sea bed.

A jacket structure for an off-shore wind turbine is dimensioned so that about two thirds are submerged. For an average water depth of about 45 m, a jacket structure can therefore have a height of about 55 m-56 m. The footprint of such a jacket structure can be in the range of 20 m across. Legs and braces of such a jacket structure are generally made of steel pipes or pipe sections. For the necessary structural stability, the legs of such a jacket structure might be about 1.0 m-1.5 m in diameter, while a brace can have a diameter of about 0.6 m-0.8 m. It will be clear that legs and braces with such dimensions are heavy elements.

A conventional approach of assembling an underwater jacket structure involves assembling modules corresponding to layers of the jacket structure. Each module comprises identical leg sections interconnected by braces extending between the neighbouring leg sections. For a tapered jacket structure that is wider at the bottom and narrower at the top, a series of differently-sized modules is constructed, and the completed modules are then successively hoisted into position, stacked on top of each other, and fastened together. Assembly can be carried out in any appropriate location, for example close to a port or harbour. The finished jacket structure can then be skidded to a quayside for transfer to an offshore location.

A significant disadvantage of the known method is that the modular assembly is quite time-consuming. The layers must be assembled one after the other, since the stack must be built up starting from the lowest level. Also, workers are required to manipulate the heavy leg segments and braces into place during the assembly. Even though the heavy parts can be hoisted into place using a crane, workers are still placed at considerable risk. Altogether, the modular assembly is time-consuming and therefore comprises a significant portion of the overall cost of manufacture of a jacket structure. For an offshore wind park comprising many turbines, the costs of such an assembly procedure can be prohibitive.

SUMMARY OF INVENTION

It is therefore an object of the invention to provide a more economical and safe way of assembling a jacket structure.

This object is achieved by the features of the independent claims.

According to the invention, a jacket assembly guide for assembling a jacket structure—which jacket structure in its assembled state comprises a plurality of legs, a plurality of connecting braces and a plurality of node elements arranged on the legs for connecting the braces to the legs—comprises a number of supporting towers for supporting the plurality of legs during assembly of the jacket structure such that a supported leg is held in a position corresponding to the position of that leg in the assembled state of the jacket structure, and a number of connecting means for releasably connecting a leg to a supporting tower.

An advantage of the jacket assembly guide according to the invention is that, because one or more legs are conveniently held in place at the correct angle by a corresponding number of supporting towers, and because the braces can be conveniently held or suspended in place between node elements on the supported legs, for example by a crane, the assembly of a jacket structure can be carried out relatively quickly, so that the overall cost of the structure can be kept favourably low. Also, because workers do not need to physically manipulate heavy parts into place, workplace safety is improved.

Furthermore, any node elements used to hold the braces in place can be conveniently attached to the legs in advance, for example before one or more of the legs are held in place by supporting towers. In contrast to the alternative modular method described above, in which different modules are separately assembled at ground level by connecting braces between leg segments of a module and then stacking the modules, the method according to the invention allows the jacket structure to be assembled essentially in one piece.

Because a supporting tower can hold an entire leg while this is being connected to various braces, that leg can be a one-piece component or can be previously assembled to its full length using a number of leg sections.

Another advantage of the jacket assembly guide of the invention is that the braces can effectively be arranged at any appropriate angle to interconnect the legs, so that an arrangement of the braces is not as limited as it would be in a modular design, in which braces can effectively only be connected between the levels bounded by the upper and lower leg segment ends. The supporting towers allow the braces to be conveniently held or suspended in place between the legs, for example by a crane, so that the assembly of a jacket structure according to the invention can be carried out relatively quickly, and the overall cost of the structure can be kept favourably low.

According to the invention, the method of assembling a jacket structure—which jacket structure in its assembled state comprises a plurality of legs, a plurality of connecting braces and a plurality of node elements arranged on the legs for connecting the braces to the legs—comprises the steps of connecting at least one leg of the plurality of legs to a supporting tower such that the leg is held in a position corresponding to the position of that leg in the assembled state of the jacket structure; holding or suspending a brace of the plurality of connecting braces in place between node elements; providing connecting access to the node elements and the braces; connecting each brace to the node elements between which it is held, and disconnecting the finished or assembled jacket structure from the jacket assembly guide.

According to the invention, the jacket structure—in particular a jacket structure for supporting for an offshore wind turbine—comprises a plurality of legs, a plurality of connecting braces and a plurality of node elements arranged on the legs for connecting the braces to the legs, which jacket structure is assembled in such a jacket assembly guide using the method according to the invention. In contrast to prior art jacket structures, the jacket structure according to the invention can even comprise one-piece legs, since it is a relatively straightforward procedure to hold such a long element in a supporting tower.

Particularly advantageous embodiments and features of the invention are given by the dependent claims, as revealed in the following description. Features of different claim categories may be combined as appropriate to give further embodiments not described herein.

A node element can comprise a part that is connected or attached to a leg such that it can in turn be connected to one end of a brace. For example, a node element can comprise a suitably shaped part that protrudes from the leg in such a way that it can be welded to one end of a brace. Alternatively, the part can be connected to an end of the brace using fasteners. To this end, both the node element and the brace end may exhibit one or more suitable through-holes through which a bolt can be passed. Other embodiments of node elements and braces will be described below.

The jacket assembly guide according to the invention allows an entire leg to be held by a supporting tower. Such a leg can be manufactured in one piece as a pipe of the required length. A one-piece leg might offer the advantage of more structural stability, but may be inconvenient to manufacture. Therefore, in a preferred embodiment of the jacket structure according to the invention, a leg comprises a plurality of leg sections or pipe pieces, wherein adjacent leg sections of the leg are joined in a leg assembly step preceding the assembly of the jacket structure. For example, a pipe piece could have an external flange at each end, and adjacent pipe pieces could be bolted together using a plurality of short bolts inserted through corresponding bolt holes in the flanges. Alternatively, the leg assembly step may comprise fastening adjacent pipe pieces using internal long bolts passed through openings in internal flanges at the ends of adjacent leg sections. In a further preferred embodiment of the jacket structure according to the invention, the ends of adjacent leg sections are shaped to permit a shear key joint between those leg sections.

As mentioned in the introduction, a conventional jacket structure may be constructed by 'stacking' modules, for example modules comprising four leg sections, wherein the leg sections are connected using diagonal braces. In such an approach, the node-to-leg connections between two successive modules are at the same level as the leg-section joints. The corresponding brace-to-node connections are therefore also formed at the same level. The jacket assembly guide according to the invention allows any potential structural weakness associated with such leg-section joint to be reduced or at least partially compensated, since the leg-section joints of the legs need not all be at the same levels. A 'modular' arrangement of node-to-leg connections and brace-to-node connections is no longer mandatory. The leg sections can be manufactured so that at least the brace-to-node connections are arranged in a staggered manner about the finished jacket structure.

In the assembly of a jacket structure comprising three or more legs, a jacket assembly guide with a single supporting tower for holding one of the legs can already simplify the assembly process. The remaining legs could comprise leg segments which are successively built up while the connecting braces are lifted into place and fastened to the leg. However, in a particularly preferred embodiment of the invention, the jacket assembly guide comprises a supporting tower for each leg of the jacket structure. For a four-leg jacket structure, the jacket assembly guide preferably comprises four supporting towers.

The supporting towers can be erected at a suitable site, for example close to a port and a skidding system, so that a completed jacket assembly can be skidded to a marine transport system for transport to its offshore destination. In this case, the supporting towers can be realised so that the completed jacket structure can pass through a space between the supporting towers. Once a completed jacket structure has been moved on, the legs for the next jacket structure can be hoisted into place, ready for assembly. In this way, a very fast and economical assembly of many jacket structures is made possible, so that the costs of an offshore wind park can be kept low.

To hold a leg in place while the braces are being connected, the legs could be temporarily welded into place. However, in a preferred embodiment of the invention, the connecting means for removably connecting a leg to the tower comprises one or more clamps arranged along its length for clamping a leg into place. Such a clamp might be mechanical, for example a ratchet clamp, or might comprise a hydraulic clamp. The step of supporting a leg by a supporting tower therefore preferably comprises securely clamping the leg to the supporting tower at one or more points along the leg. When the jacket structure is complete, the clamps can simply be released or opened to release the assembled structure.

Once the legs are supported in place, workers can commence connecting the braces between appropriate points on the legs. To this end, the jacket assembly guide according to the invention preferably comprises an access means for providing connecting access to node elements and braces held or suspended between the node elements. Such an access means can comprises an access platform, realised so that a worker can safely stand on the platform and access the relevant parts of the leg to which a brace is to be connected. A platform can be dimensioned so that several workers have room to manoeuvre.

As mentioned above, a jacket structure can easily reach 50-60 m in height. To be able to access all parts of a leg to which a brace is to be connected, the access means of the jacket assembly guide according to the invention preferably comprises an elevator. Such an elevator can provide rapid access to all platforms of a supporting tower.

The access means can be realised as a separate entity, for example, as a type of gantry that can be moved around relative to the supporting legs. However, in a preferred embodiment of the invention, the access means is incorporated in a supporting tower. For example, a supporting tower can comprise one or more access platforms and/or an elevator to provide access to the platform(s). It might suffice if a single supporting tower is equipped with an elevator. For example, if each supporting tower is realised with an appropriate number of access platforms, and these access platforms are connected by gangways, then a single elevator in one of the supporting towers can be sufficient to provide worker access to each access platform. For convenience, it might be preferable if such platforms are arranged at essentially the same levels, so that gangways can be used to connect them. This might be feasible if the nodes at which braces are connected to the legs are arranged uniformly in the jacket structure design. For example, the lowest set of braces might all be of the same length and might therefore all terminate at the same level in the jacket structure. The nodes connecting the brace ends to the legs are therefore also all essentially at the same level. If a more flexible brace arrangement is desired, using braces of different lengths, the position of a gangway could be adjustable, for example using a hydraulic arrangement to raise one end of a gangway so that it can reach the next access platform.

Alternatively, in a further preferred embodiment of the invention, each supporting tower could be equipped with its own elevator as well as several access platforms. Preferably, an access platform is arranged at a level corresponding to a level of a node element of the leg supported by the supporting tower.

Of course, a supporting tower can preferably comprise a plurality of access platforms and an elevator, whereby the elevator can provide access to each access platform. A combined elevator/access platform design might also involve a funicular track, mounted for example on the exterior of a supporting leg, along which a moveable access platform can travel.

A node element could be attached to a leg while it is also being connected to one end of a brace. However, this might be complicated and might involve too much manpower to simultaneously manipulate the various (heavy) parts. Therefore, in the method according to the invention, the step of attaching a node element to a leg is preferably carried out prior to the step of connecting the braces to the node elements. Preferably, the node elements of the jacket structure are connected to the legs before these are clamped to the supporting towers. For example, the node elements of a leg can conveniently be connected to the leg while the leg is in a horizontal position before being hoisted into place for clamping to a supporting tower.

A node element can comprise an essentially cylindrical part which is slipped over the leg and then fastened into place. Such a node element would need to be precisely machined to ensure a sufficiently close fit. Furthermore, this design might limit the legs to being pipe pieces with a constant diameter over their entire length. In a preferred embodiment of the invention, therefore, a node element comprises a number of shell pieces or halves which can be arranged around the leg at an appropriate position, and which can be fastened together, for example using bolts. The shell pieces of a node element allow the node element to be fastened securely to the leg, since these can be tightened as required to ensure that the node element fits snugly about the leg. Furthermore, a tapering leg design is also possible, since it is a relatively simple matter to manufacture shell pieces that fit to a tapering leg. Any type of node/leg connection can be further improved by the use of an adhesive layer such as an epoxy resin or a grout between the node and the leg.

There are various ways of connecting a node to a brace element. For example, a brace can comprise a pipe piece, or a length of pipe, with a cast gusset at either end. The cast gusset can be connected to the pipe piece by means of flanges and bolts. The cast gusset can be designed to fit a tray of a clevis on the node and can be connected to this by a suitable pin bolt. For example, the cast gusset can have a through-hole that matches through-holes in the walls of a clevis when the brace is positioned in the clevis. To connect brace and node together, a pin bolt such as an expansion bolt can be passed through the through-holes. An alternative realisation might be a node with a cast tubular extension arranged at an angle coinciding with the angle of a brace. The cast tubular extension can have a flange corresponding to a flange at the end of the brace, and these can be bolted together. In these realisations, a node element is first connected to the leg, and then connected to the brace. Alternatively, a brace and a tubular node extension can be shaped to simply fit one over the other, for example by shaping the tubular extension to fit inside the brace pipe piece. To assemble this joint, a node half with the tubular extension can be inserted into the brace pipe piece, and then arranged on the leg to fit to a second node half, and these can then be bolted or otherwise fastened together.

To connect the braces to the nodes while the legs are held by the supporting towers, the braces can be lifted into place in any manner that is convenient. Preferably, the step of holding a brace between node elements comprises using a lifting apparatus to suspend the brace in position between the node elements.

BRIEF DESCRIPTION OF THE DRAWINGS

Other objects and features of the present invention will become apparent from the following detailed descriptions considered in conjunction with the accompanying drawings. It is to be understood, however, that the drawings are designed solely for the purposes of illustration and not as a definition of the limits of the invention.

DETAILED DESCRIPTION OF INVENTION

In the diagrams, like numbers refer to like objects throughout. Objects in the diagrams are not necessarily drawn to scale.

Figure 1:
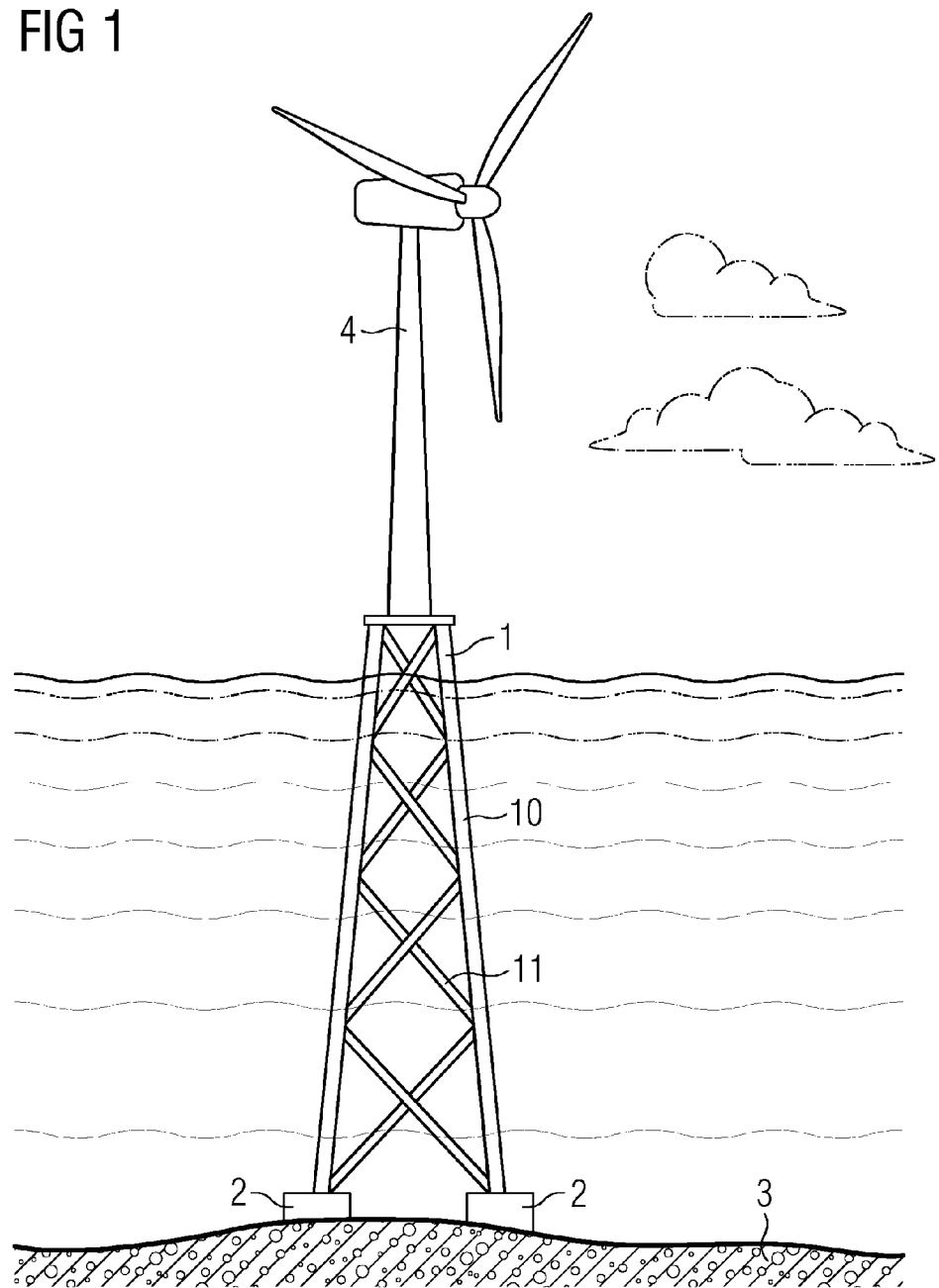
FIG. 1 shows a jacket structure supporting an offshore wind turbine.

FIG. 1 shows a jacket structure 1 used in an offshore location. The jacket structure 1 comprises several legs 10 interconnected by a plurality of braces 11, and is held in place (in this example) by piles 2 driven into the sea bed 3. The jacket structure 1 serves to support a wind turbine 4 in a deep offshore location, for example in water depths exceeding 40 m. The wind turbine 4 itself can be quite large, for example about 80 m in height with a rotor diameter in the range of 100-140 m, particularly when housing a powerful generator in the Megawatt range. To provide the necessary structural stability, the jacket structure 1 can be made of steel legs and braces, securely fastened to each other at nodes along the legs. The largely 'empty' structure therefore presents a relatively small surface area to the forces acting on it above and below the water level.

Figure 2:
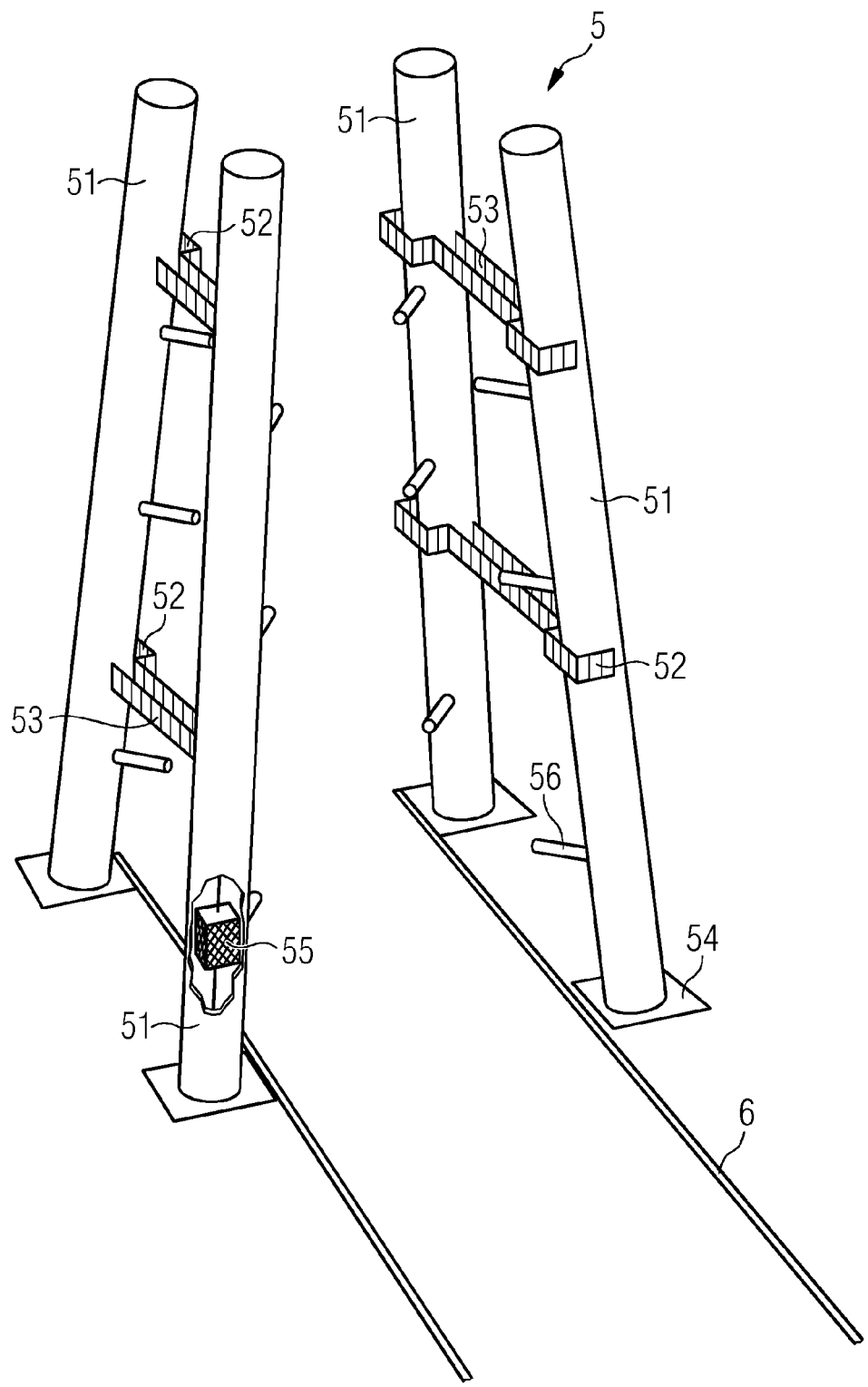
FIG. 2 shows a jacket assembly guide according to an embodiment of the invention.

FIG. 2 shows a jacket assembly guide 5 according to an embodiment of the invention. Here, the jacket assembly guide 5 comprises four supporting towers 51 for each of four legs of a jacket structure. In this embodiment, each supporting tower 51 is tilted at an angle corresponding to the angle of a leg of an assembled jacket structure. The supporting towers 51 could themselves be held in place by some other module such as a crane or gantry. In this example, the supporting towers 51 are secured at ground level by anchoring to a suitable foundation 54. Each supporting leg 51 has a number of clamps 56 arranged at appropriate intervals for holding a leg of a jacket structure to be assembled. Access platforms 52 are arranged on the supporting towers 51. These access platforms 52 can be fixed at strategic positions along the supporting towers 51 to provide convenient access to node elements of the legs, or may be movable along the supporting towers 51. An elevator 55 (indicated by the dashed line) in a supporting tower 51 provides access to the access platforms 52. A gangway 53 provides access to node elements on legs held by supporting towers that do not have an access platform or elevator. The access platforms 52 and any gangways 53 are arranged on the jacket assembly guide 5 so that the assembled jacket structure can be skidded out from the jacket assembly guide 5 along tracks 6 of a skidding system.

Figure 3:
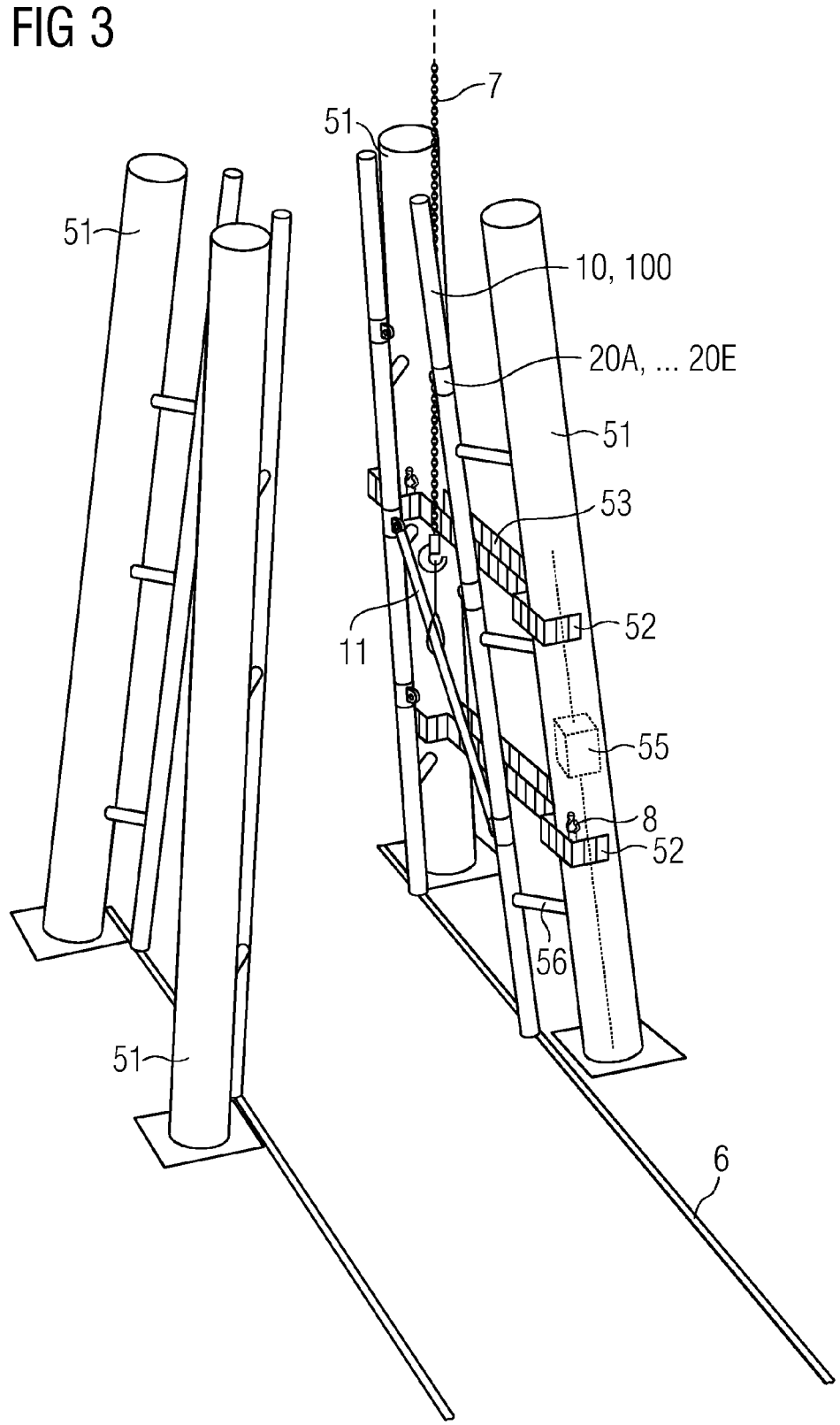
FIG. 3 shows a jacket structure being assembled using the jacket assembly guide of FIG. 2.

FIG. 3 shows a jacket structure being assembled using the jacket assembly guide 5 of FIG. 2. Here, the legs 10, 100 are clamped in place by the clamps 56 arranged on the supporting towers 51. The legs 10, 100 are therefore already held at the angle required to obtain the desired geometry of the finished jacket structure. A leg can be a one-piece leg 100 made of a single pipe piece, or can comprise several leg parts connected together by internal or external flanges, a shear key, or any other suitable joint, as will be explained later. A crane (not shown) is used to hoist braces 11 into place between the legs 10, 100. Workers 8 on the access platforms 52 can manoeuvre the braces 11 so that each end of a brace 11 is correctly positioned relative to a corresponding node element 20A, . . . , 20E previously mounted on the leg 10, 100. Here, a brace 11 is shown suspended in place by crane tackle 7 of a crane, so that workers 8 on two access platforms can connect each end of the brace 11 to a corresponding node element 20A, . . . , 20E on a leg 10, 100. Once the brace ends are positioned in the corresponding node elements 20A, . . . , 20E, the crane can be used to fetch the next brace 11. The workers need only fasten the brace 11 to the node elements 20A, . . . , 20E at each end, and can then use the elevators 55 or gangways 53 to move to the next node element 20A, . . . , 20E in preparation for connecting the next brace 11. In this way, a fairly quick assembly process is made possible. Once the jacket structure 1 has been assembled, it can be released from the assembly guide 5 by skidding it along the skidding tracks 6, and the legs 10, 100 for the next jacket structure can be hoisted into place and clamped to the supporting towers 51.

Figure 4:
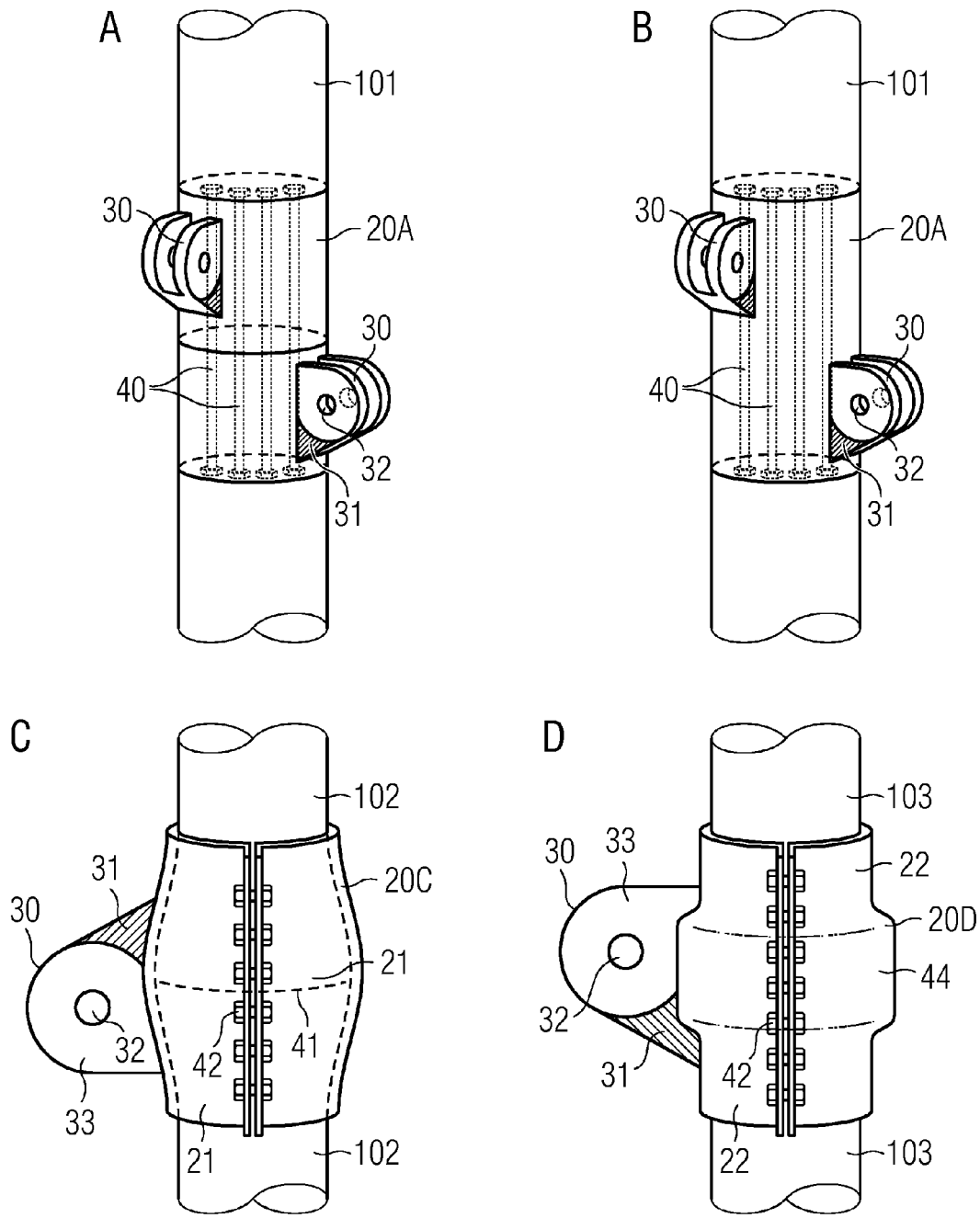
FIG. 4 shows various realisations of a node element for a jacket structure according to the invention.

FIG. 4 shows various realisations of node elements 20A, 20B, 20C, 20D for connecting a leg to one or more braces of a jacket structure according to the invention. In a first embodiment shown in part A of the diagram, a node 20A is a cast node 20A with a clevis 30. One or two such cast nodes 20A can be bolted between leg parts 101 of a leg. In the example shown, the cast nodes 20A are connected to the leg parts 101 by means of long bolts 40 through flanges in the interior of the leg. Each clevis 30 comprises a clevis tray 31 and a clevis through hole 32 for later connecting to a brace.

In a second embodiment shown in part B of the diagram, a node 20B is a cast node 20B with two clevises 30. One such cast node 20B can be bolted between leg parts 101 of a leg.

In a third embodiment shown in part C of the diagram, a node 20C is realised as two halves 21 or shell pieces 21 shaped to fit over a shear key joint 41 or shear lock 41, indicated by the dashed lines, between leg pieces 102. One or more clevises 30 can be arranged onto one of the halves or shell pieces 21, for example by casting. Again, such a clevis 30 comprises a clevis tray 31 and side walls 33 with through holes 32 for connecting to a brace. The node halves 21 can be bolted together using short bolts 42 on flanges 25 along the vertical edges of the node halves 21.

In a fourth embodiment shown in part D of the diagram, a node 20D is realised as two halves 22 or shell pieces 22 shaped to fit over an external flange joint of two leg pieces 103, as indicated by the broken lines. This embodiment might be favourable if leg pieces 103, with external flanges for bolting together using short bolts, are to be used. Again, one of the node halves 22 of the node 20D can be cast with one or more clevises 30 for connecting to a corresponding number of braces.

A node can have a single clevis, or more than one clevis. For example, for a four-leg jacket, two clevises can be arranged on a node at essentially right angles to provide connecting points for two braces arranged between two leg pairs, whereby one leg is common to each leg pair, and the node is arranged on that leg. For a three-leg jacket, two devises could be arranged at an essentially 120° angle to each other on the node.

Figure 5:
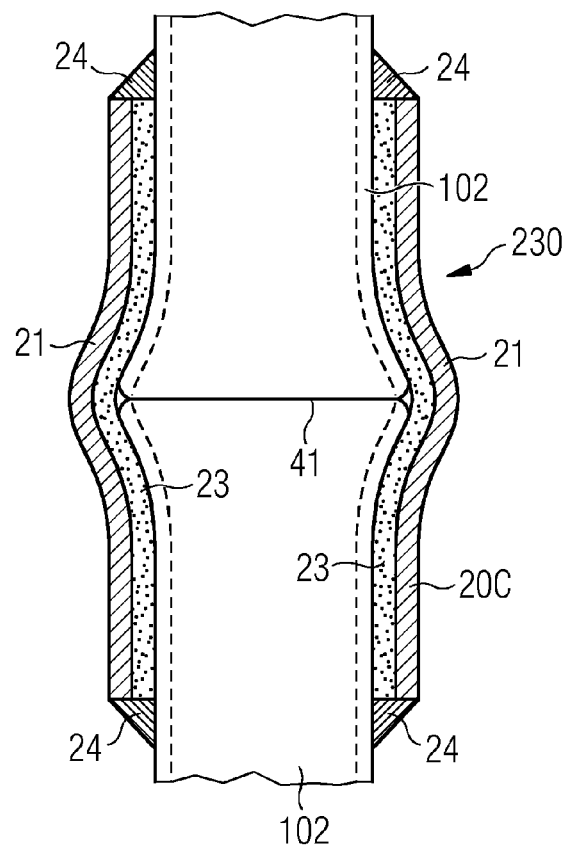
FIG. 5 shows a cross-section of an adhesive connection between a node element and a leg for a jacket structure according to the invention.

In any of the embodiments shown above in which a node 20C, 20D comprises node halves 21, 22 or shell pieces 21, 22, grout or adhesive can be applied between a node shell piece 21, 22 and the leg. Such an adhesive joint 230 is shown in cross-section in FIG. 5. Here, two node halves 21 of a node 20C are shown, shaped to fit over a shear key joint 41 between leg pieces 102. Any gaps between the node 20C and the leg pieces 102 are sealed using a seal 24 arranged around the circumference of the leg sections 102, and then an adhesive (e.g. an epoxy resin) 23 or grout 23 is pumped through a suitable channel (not shown) into the space between the node shell pieces 21 and the leg pieces 102. The adhesive 23 or grout 23 is subsequently allowed to cure or harden. An advantage of such a node with an adhesive joint 230 is that it can be mounted onto the leg while this is being held in the jacket assembly guide, and its position and/or orientation can be adjusted to accommodate for any intolerances or deviations regarding the length/position of the brace.

Figure 6:
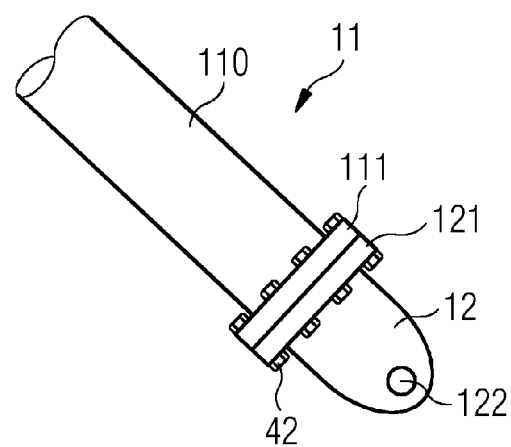
FIG. 6 shows a flanged connection between a node element and a brace in a jacket structure according to the invention.

A brace 11 can comprise a pipe piece 110 with a cast gusset 12 at either end (only one is shown here) for connecting to a clevis of a node, as shown in FIG. 6. The cast gusset 12 is connected to the brace pipe piece 110 by means of bolts 42 passed through external flanges 121, 111. The cast gusset 12 is solid with a through-hole 122 that is dimensioned to sit between the through holes of a clevis.

Figure 7:
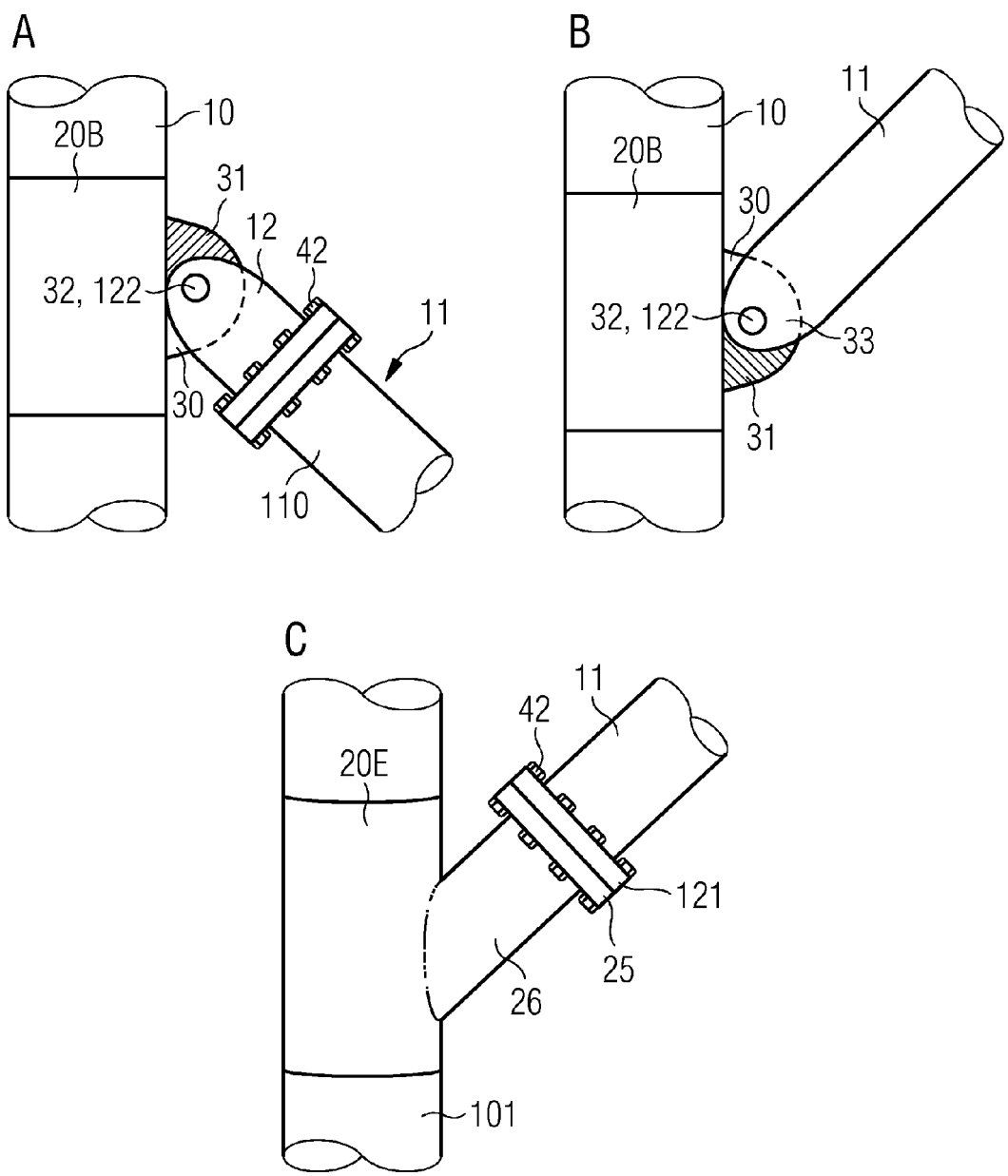
FIG. 7 shows various connections between a node element and a brace for a jacket structure according to the invention.

FIG. 7 shows various embodiments of a connection between a node element and a brace 11 in a jacket structure according to the invention. Part A of the diagram shows a brace 11 connected at its upper end to a downward-facing clevis 30 of a node. Here, node 20B is used as an example. The clevis tray 31 and the gusset 12 form a relatively close fit to prevent an upward movement of the brace 11. A suitable pin bolt can be passed through the through holes 32, 122 in order to connect the node and the brace 11. In part B of the diagram, a brace 11 is connected at its lower end to a upward-facing clevis 30 of a node 20B. The step of fastening the brace to the node is carried out while the leg is held in the jacket assembly guide. Part C of the diagram shows a flanged connection between a further node 20E and a brace 11 in a jacket structure according to the invention. Here, the node 20E and brace 11 are joined by means of a flange-to-flange joint. The node 20E comprises a cast tubular extension 26 arranged at a suitable angle to meet the brace 11. Here, the tubular extension 26 is shown to point upward, for connecting to a lower end of the brace 11, and comprises a flange 25 at its outer end. The brace 11 also has a corresponding flange 121 at its lower end. The flanges 25, 121 are connected by means of suitable short bolts.

Figure 8:
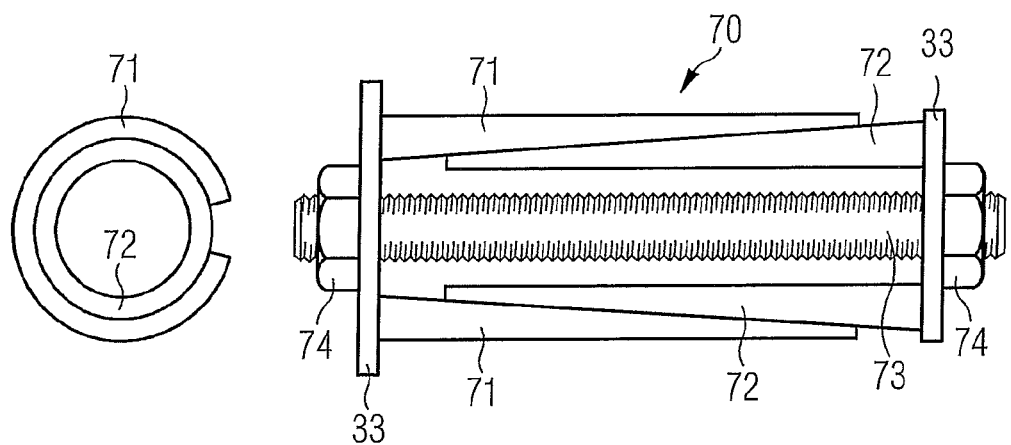
FIG. 8 shows an expansion bolt for connecting a brace to a node element in a jacket structure according to the invention.

FIG. 8 shows a pin bolt 70, in this case an expansion bolt 70, for connecting a brace to a clevis node in a jacket structure according to the invention. The expansion bolt 70 comprises an inner cylinder 72 with a constant internal diameter and a tapering external diameter, and an outer cylinder 71 with a constant external diameter, a tapering internal diameter, and a longitudinal split. The cylinders 71, 72 are arranged around a threaded shaft 73. The external diameter of the outer cylinder 71 fits relatively closely inside the gusset through hole. The expansion bolt 70 is assembled between the clevis walls 33 and inside the gusset through-hole. The bolt 70 is then tightened by mean of nuts 74 at the outer ends of the threaded shaft 73, so that the outer cylinder expands and is forced against the inside of the gusset through-hole. In this way, a sturdy connection is assured between a brace and a node, requiring relatively few fastening parts.

Although the present invention has been disclosed in the form of preferred embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

The invention claimed is:

1. A jacket assembly guide for assembling a jacket structure, the jacket structure comprising a plurality of legs, a plurality of connecting braces and a plurality of node elements arranged on the legs for connecting the braces to the legs, the assembly guide comprising:
   a plurality of supporting towers for supporting the plurality of legs to commence connecting the braces; and
   a plurality of connecting devices for releasably connecting one of the legs to one of the supporting towers,
   wherein each supporting tower is secured with respect to a ground level, being tilted at an angle corresponding to the angle of one of the plurality of legs of an assembled jacket structure, such that the supported leg is held in a position corresponding to the position of that leg in the assembled state of the jacket structure.

2. The jacket assembly guide according to claim 1, further comprising an access device for providing connecting access to the node elements and the braces held between the node elements.

3. The jacket assembly guide according to claim 2, wherein the access device comprises an access platform and/or an elevator.

4. The jacket assembly guide according to claim 3, wherein at least one of the supporting towers comprises the access platform and/or the elevator.

5. The jacket assembly guide according to claim 4, wherein the access platform is arranged at a level corresponding to a level of one of said plurality of node elements of the leg supported by the supporting tower.

6. The jacket assembly guide according to claim 4, wherein said at least one supporting tower comprises a plurality of said access platforms and said elevator, wherein the elevator extends to the level of at least one of the access platforms.

7. The jacket assembly guide according to claim 1, further comprising one of said plurality of supporting towers for each leg of the jacket structure.

8. The jacket assembly guide according to claim 7, wherein at least one of the connecting devices comprises a clamp.

9. The jacket assembly guide according to claim 1, further comprising a securing structure for securing each supporting tower to the ground at said angle.

10. The jacket assembly guide according to claim 1, wherein the number of supporting towers corresponds to the number of legs of the jacket structure, wherein each supporting leg supports a respective leg in position corresponding to the position of said respective leg in the assembled state.

11. A method of assembling a jacket structure, which jacket structure comprises a plurality of legs, a plurality of connecting braces and a plurality of node elements arranged on the legs for connecting the braces to the legs, the method comprising the steps of:
   connecting at least one leg of the plurality of legs to a supporting tower of a jacket assembly guide to commence connecting of the braces such that the leg is held in a position corresponding to the position of that leg in the assembled state of the jacket structure, wherein each supporting tower is secured with respect to a ground level, being tilted at an angle corresponding to the angle of a leg of an assembled jacket structure;
   holding a brace of the plurality of connecting braces in place between node elements;
   providing connecting access to the node elements and the braces;
   connecting each brace to the node elements between which it is held; and
   disconnecting the leg from the supporting tower to release the assembled jacket structure,
   wherein, while the braces are being connected to the node elements, the at least one leg is held in said position corresponding to the position of that leg in the assembled state of the jacket structure.

12. The method according to claim 11, wherein the step of connecting a leg to a supporting tower comprises clamping the leg to the supporting tower.

13. The method according to claim 11, wherein the step of holding a brace between node elements comprises using a lifting apparatus to suspend the brace in position between the node elements.

14. The method according to any of claim 11, wherein the step of connecting a brace to the node elements between which it is held comprises connecting one end of the brace to a corresponding region of a node element by via a clevis and/or a flange and/or an adhesive.

15. The method according to claim 11, further comprising the step of attaching one of the node elements to one of the legs, which node element attaching step is carried out prior to the step of connecting the braces to the node elements.

16. The method according to claim 15, wherein said one of the node elements comprises a plurality of shell pieces attached to the leg via bolts and/or adhesive.

* * * * *